though the morpholine is added in an amount larger than the amount required to make soap with the fatty acid, the soap remains stable in the aqueous medium.

United States Patent Office 3,565,655
Patented Feb. 23, 1971

3,565,655
METHOD OF PREPARING AQUEOUS METALLIC FLAKES
Isao Higaki, Gose-shi, Japan, assignor to Showa Aluminum Powder Co., Ltd., Gose-shi, Nara, Japan
No Drawing. Filed Apr. 1, 1968, Ser. No. 717,989
Claims priority, application Japan, May 9, 1967, 42/28,874
Int. Cl. C09c 1/62
U.S. Cl. 106—290                   18 Claims

ABSTRACT OF THE DISCLOSURE

A method of preparing aqueous metallic flakes wherein a malleable metal or malleable metal alloy is ground in an aqueous medium containing a higher fatty acid, morpholine in at least an equimol amount with the fatty acid, and a solubilized normally non-water soluble organic liquid.

BACKGROUND OF THE INVENTION

The present invention relates to a method of preparing a metallic flake, particularly an aqueous metallic flake suitable for use as a pigment in water paints, which comprises grinding a malleable metal or a malleable alloy, for example aluminum, copper, zinc, brass, bronze and the like, in water.

Recently, the paint industry has made progress in the development of a number of new vehicles and pigments which have enabled new coating techniques.

Heretofore, it has been usual that most paints, with few exceptions were prepared by mixing a pigment in an oily vehicle. However, a number of aqueous paint vehicles have now been developed which are dilutable with water for easy coating. In general, unlike oil base vehicles, metals are reactive with water when they are in the form of finely divided powders. For example,

$$2Al + 6H_2O \rightarrow 2Al(OH)_3 + 3H_2\uparrow$$

Because of the high reactivity of metallic pigments, water base paints have not found full acceptance in the industry because they are unstable and susceptible to violet oxidation reactions between the metallic flakes and the water. There is a need, therefore, for a method of providing metallic flakes which would remain stable in water base paints even after extended periods of storage.

Therefore, the metallic flakes used most widely today are oily and are normally prepared accordingly to the wet grinding technique disclosed by Hall U.S. Pat. No. 2,002,891. Several similar methods have been disclosed, but the metallic flakes obtained according to these methods are substantially hydrophobic, and cannot be dispersed in water.

Consequently, metallic flakes which can be suspended in water were prepared either by finely grinding the metallic flakes in the presence of the above described oily medium (so called "wet grinding technique") and thereafter adding amines or surface active agents to the metallic flake paste from which the medium has been separated to modify the surface characteristic of the oily medium, or by using an aqueous medium in combination with a surface active agent to make suspension possible. These prior art metallic flakes cannot be contacted with water during storage however, since they are low in water stability.

A metallic pigment used in a water paint must have good water dispersibility. However, the conversion of an oily flake to an aqueous flake poses such a problem as is mentioned below:

A scaly metallic flake which which has been completely converted to hydrophilic, can be completely dispersed in a water paint. However, if the conversion is not complete, the metallic flake disperses in water as a block in which its core is olephillic and its surface hydrophilic. The coating of water paint having the metallic flakes in complete dispersion is high in gloss since the scaly particles are uniformly distributed in the coating and arranged in parallel with the coating. In contrast, when an incomplete dispersion of the metallic flakes is formed, the flakes are distributed in the form of a mass in the coating and thereby the coating is uneven and lusterless. Besides the oily wet grinding technique as described above, a method of grinding in water has been proposed.

In this method, when the metal is ground to obtain a flake, the reaction of the metal with water is inhibited by avoiding the contact of the metal with water as much as possible by emulsifying and dispersing a lubricant which prevents the metal powders from oxidation. Suitable dispersants include the fats, fatty acid salts and the like. However, the emulsified lubricant forms a relatively large micelle in water, is not stable and needs an appropriate temperature control. Also, a lubricant in a relatively high concentration is needed to efficiently cover the newly formed surface of metallic flake. Close attention must therefore be paid to prevent the lubricant from condensing on the addition of large amounts of emulsifier.

Maintaining such an emulsified state is not only difficult, but also efficiently prevently the finely divided powder of metal from oxidation is impossible, and therefore, a coating surface of excellent gloss can not be obtained. Further, the covering area of the water, which is an important characteristic of a pigment for paint, is small, and also, when being stored in the form of aqueous flake paste, oxidation occurs and the ability of the metallic flake to act as a pigment is lost and the paint is generally unstable. The term "covering area of the water" means an area covering in the form of monofilm when 1 g. of metallic pigment is placed on the surface of water. The larger the covering area of the water, the smoother and broader is the coating obtained and the more advantageous.

SUMMARY OF THE INVENTION

It is therefore an object of this invention to obtain an aqueous flake having good water dispersibility, a large covering area on water, an excellent gloss of coating surface and excellent storage stability.

Accordingly, the present invention relates to a method of preparing an aqueous metallic flakes which comprises grinding a malleable metal in an aqueous medium containing a higher fatty acid, morpholine in at least an equimolar amount and a solubilized non-water soluble organic liquid.

DETAILED DESCRIPTION OF PREFERRED EMBODIMENTS

The term "aqueous medium" herein means a coexisting liquid remaining after finely grinding the metal. The malleable metals used in the present invention include aluminum metal, copper metal, zinc metal, brass, bronze, and other malleable metals and alloys, and, in the finely grinding step of the present invention, metallic powders of less than 5 mesh or metallic foil scraps of less than 5 mm.$^2$ are preferable. These metallic powders or metallic foil scraps are preferably degreased before use. The novel point of the present invention, differing from the conventional techniques, consists in using a aqueous medium as a medium in a step of finely grinding a metal, which contains a solubilized non-water soluble organic liquid which is inert to a metal and is liquid in the temperature of grinding step.

The non-water soluble organic liquid used in the present invention is a hydrocarbon solvent of the type usually used as a medium for obtaining an oily metallic flake by the wet grinding technique, for example, mineral spirits, solvent naphtha, turpentine oil, benzene, tiluene, xylene, and halogenated hydrocarbons, e.g., chlorinated paraffins, trichlorodiphenyl, and the like. The higher the boiling points of these organic liquids, i.e. the lower the vapor pressure, the higher the storage stability of the metallic flake obtained. Trichlorodiphenyl, naphtha, etc. are particularly preferably for maximum storage stability.

On the other hand, toluene, xylene, and other liquids of relatively low boiling points are also comparable with organic liquids of high boiling points in water dispersibility, covering power, and gloss of coating surface although somewhat poorer in storage stability and can render metallic flakes of excellent properties in comparison with those obtained by conventional methods.

In the present invention, a higher saturated or unsaturated fatty acid having 12 to 18 carbon atoms is appropriately used, and preferably, the fatty acids are liquid at the grinding temperature. Solid fatty acids can be used but are less effective since they can be solubilized only in small amounts. However, even solid fatty acids provide a better effect than conventional techniques. In general a fatty acid having a melting point below 60° C. is preferable.

The fatty acid which can be used in the present invention includes the saturated fatty acids, such as stearic acid, palmitic acid, etc. the unsaturated fatty acids, such as oleic acid, linolic acid, linolenic acid, etc. An unsaturated fatty acid, such as oleic acid, linolic acid, lonolenic acid, etc., which is liquid at ordinary temperatures shows a preferable effect in the solubilization of non-water soluble organic liquids. Such fatty acids are considered to form an ammonium salt with morpholine in an aqueous medium thereby solubilizing the non-water soluble organic liquid.

In the present invention 2 to 10% of fatty acid is employed, based on the weight of metal, and 3–5% is desirable, although amounts outside the range of 2% to 10% by weight, can be employed without deleterious effect. If below 2% by weight is used, the covering of fatty acid on the metal surface is usually not satisfactory and the quality of coating is degraded. At amounts above 10% by weight, the effect is not changed substantially, but the excess amount acts as an extender in the paint composition which is not preferably. Morpholine must be used at least in an equimolar amount with the fatty acid. If below the equimolar amount, the non-water soluble organic liquid is solubilized and the metal will tend to react with the water and oxygen in the air, and the quality of the product is degraded. Use of more than the equimolar amount is harmless, but is economically in vain. In general, up to two times the equimolar amount is preferable.

The amount of non-water soluble organic liquid used is generally 2.0 to 20%, preferably 2.5 to 6%, based on the weight of metal. At less than 2.0% by weight, a sufficient effect is not obtained, and even if more than 20%, by weight of the organic liquid is present, solubilization is not obtained.

The total amount of the aqueous medium used on grinding the metal is preferably 80 to 150% based on the weight of metal.

All or a part of the non-water soluble organic liquid is solubilized with morpholine and a fatty acid. If all the liquid is not solubilized, solubilization can be aided by adding a water soluble organic compound. The water soluble organic compound such as the soluble alcohols (e.g., n-propyl alcohol, i-propyl alcohol), soluble ketones (e.g. acetone) or dioxane, etc. may be employed. The amount of water soluble organic compound used is the amount necessary for solubilization and in general can replace up to 5 to 50%, by weight, of the water in the medium. The water soluble organic compound acts as a defoaming agent. When the system consisting of morpholine, a fatty acid, and a non-water soluble organic liquid is solubilized in water, it is not necessary to add alcohols, ketones, dioxane, etc. as an accelerator for solubilization. However, when an aqueous medium containing a high concentration of non-water soluble organic liquid is used, an addition of the accelerator is needed.

As understood from the above description, the system of a fatty acid and non-water soluble organic liquid exists uniformly in an aqueous medium containing morpholine, a fatty acid, and a solubilized non-water soluble organic liquid. The medium is therefore substantially different from the usual medium existing in the emulsified form.

In the present invention, the whole medium is transparent and is uniformly dissolved. Even if a new surface of the metal is exposed, such as by grinding, the surface is covered more closely with a fatty acid-morpholine so that contact with water is thereby prevented and the gloss of a coating surface of metallic flakes is improved. The medium in a state in which an organic liquid is solubilized exists and is stable even at a lower temperature, such as 2° C., and its equilibrium state is not broken by external effects as an emulsion, and hence can be operated very safely.

Various additives improving the anti-corrosiveness of metals have been developed and a series of ammonium derivatives are well known to be effective as an anticorrosive agent. Morpholine used in the present invention is such an anticorrosive agent.

Morpholine used in the present invention is sufficiently effective as an anti-corrosive agent even in small amounts and, even if combined with a fatty acid forming a morpholine soap.

Morpholine and its fatty acid salts are considered to have such an effect because they have a strong affinity to metal, thereby preventing contact of the metal with the water. The metallic flake paste is therefore high in storage stability even after washing and filtering.

According to the present invention, a quite novel type of aqueous medium has been discovered by grinding a malleable metal in an aqueous medium. By grinding a metal in the medium of the present invention, good water dispersibility, oxidation resistance, improvement in covering area, improvement in gloss of the coated surface and improved storage stability can be obtained. After completing the grinding step, the metal flakes are washed from the mill with water, and filter separated.

After grinding a malleable metal in the presence of the aqueous medium of the present invention, morpholine, a fatty acid and a non-water soluble aqueous liquid form an emulsion containing a metallic flake by addition of washing water. When separating the metallic flakes from a large amount of wash water, by means of a conventional filtering apparatus, the morpholine, fatty acid and non-water soluble organic liquid which have been emulsified remain in the metallic flake and only the water and soluble accelerator are separated. The water content of metallic flake paste varies depending on the type of separator used and is usually 20 to 40% by weight, and the metallic flake paste is stored as is, or sent to an after-treating step.

The effect of the present invention is shown by the fact that even the metallic flake of the present invention, which is to be stored as it is, maintains not only good water dispersibility when being redispersed, but also does not degrade the gloss of the coating surface.

This appears to be caused by the fact that morpholine, fatty acid and a non-water soluble organic liquid as described above firmly coat the metallic flake to prevent it from contacting either air or water, thereby maintaining the newly ground surface as is.

The grinding apparatus which can be used in carrying out the present invention is not limited, but a ball mill is preferable.

The present invention is further illustrated by the working examples as follows:

EXAMPLE 1

An aqueous medium consisting of:

| | Percent by weight |
|---|---|
| Morpholine | 2.5 |
| Oleic acid | 4.0 |
| Solvent naphtha | 5.0 |
| i-Propyl alcohol | 6.0 |
| Water | Balance | and aluminum foil scraps (less and 5 mm.², degreased) at the same weight were placed in a ball mill and ground at the ordinary temperature for 12 hours. After grinding, the aluminum flakes were washed from the ball mill and a large amount of water is removed by a filter press. The covering area on water of cakes thus obtained is 15,500 cm.²/g. A water paint was prepared from the cakes using vinyl acetate latex. The gloss the coating with surface obtained by coating the water paint was 60% in reflectivity, as measured according to ASTM D–523–53T. In contrast, the gloss of coating surfaces obtained in the same manner using the aqueous flakes prepared according to the process of preparing an aqueous flake by converting an oily flake to an oil-in-water type emulsion using an oil soluble surface active agent (Japanese patent application publication No. 30/1978) and the process of preparing an aqueous flake by dispersing an oily flake in an aqueous solution of phospheric acid (Japanese patent application publication No. 30/5884) were 22 and 28%, respectively. The cake of aluminum flake with a 60% metal content was observed to be good in water dispersibility, not changed in the gloss of its coating, and to have an execllent storage stability, even after one year.

EXAMPLE 2

An aqueous medium consisting of:

| | Percent by weight |
|---|---|
| Morpholine | 3.1 |
| Linolic acid | 10.0 |
| Tricrlorodiphenyl | 3.0 |
| N-propyl alcohol | 8.0 |
| Water | Balance | and aluminum foil scraps of the same weight were placed in a ball mill and ground for eight hours to give an aluminum flake paste. The aluminum flake obtained was 9000 cm.²/g. in covering area on water and 54% in reflectivity. No change was observed even after storage for one year.

EXAMPLE 3

An aqueous medium consisting of:

| | Percent by weight |
|---|---|
| Morpholine | 1.0 |
| Linolenic acid | 2.0 |
| Mineral spirit | 6.0 |
| Acetone | 8.0 |
| Water | Balance | and aluminum foil scraps of the same weight were placed in a ball mill and ground for 12 hours to give an aluminum flake paste. The aluminum flake obtained was 13,500 cm.²/g. in covering area on water and 50% in reflectivity. Even after storage for 4 to 6 months, no change was observed.

EXAMPLE 4

An aqueous medium consisting of:

| | Percent by weight |
|---|---|
| Morpholine | 2.6 |
| Lauric acid | 3.0 |
| Xylol | 18.0 |
| Dioxane | 38.0 |
| Water | Balance | and aluminum powder (prepared by the atomizing method, all passed 60 mesh) of the same weight were placed in ball mill and ground for 12 hours to give an aluminum flake paste. The aluminum flake was 15,500 cm.²/g. in covering area on water and 50% in reflectivity. At the end of one year, the paste was tougher than that in Examples 1 and 2 and decreased in water dispersibility, but the gloss of coating surface after being redispersed completely was not changed in comparison with that just after manufacture.

EXAMPLE 5

An aqueous medium consisting of:

| | Percent by weight |
|---|---|
| Morpholine | 2.5 |
| Stearic acid | 4.0 |
| Chlorinated paraffin ($C_{24}H_{44}Cl_6$) | 2.3 |
| i-Propyl alcohol | 15.0 |
| Water | Balance | and aluminum foil scraps of the same weight were placed in a ball mill and ground for eight hours to give an aluminum flake cake.

The aluminum flake cake was 7000 cm.²/g. in covering area on water and 42% in reflectivity, and no change was observed after storage for four to six months.

EXAMPLE 6

An aqueous medium consisting of:

| | Percent by weight |
|---|---|
| Morpholine | 2.5 |
| Oleic acid | 4.0 |
| Chlorinated paraffin ($C_{23}H_{41}Cl_7$) | 5.0 |
| i-Propyl alcohol | 15.0 |
| Water | Balance | and degreased brass powder (all passed 10 mesh) of the same weight were placed in a ball mill and ground for eight hours. The brass flake was 3300 cm.²/g. in covering area on water and its color was excellent. Its storage stability was also excellent and even at the end of one year no changes were observed.

EXAMPLE 7

An aqueous medium consisting of:

| | Percent by weight |
|---|---|
| Morpholine | 2.5 |
| Oleic acid | 4.0 |
| Mineral spirit | 5.0 |
| i-Propyl alcohol | 10.0 |
| Water | Balance | and zinc powder (all passed 10 mesh) were placed in a ball mill and ground for ten hours.

The zinc flake thus obtained was 3000 cm.²/g. in covering area on water. The zinc flake was not changed by storage for 4 to 6 months.

What is claimed is:

1. In the method of preparing an aqueous flake comprising grinding a malleable metal in an aqueous medium the improvement which comprises conducting said grinding in an aqueous medium containing from 2 to 10% of a higher fatty acid based on the weight of said metal, morpholine in at least an equimolar amount of said fatty acid and from 2 to 20%, based on the weight of said metal, of an organic liquid selected from the group consisting of hydrocarbons, halogenated hydrocarbons, solvent naphtha and mineral spirit.

2. The method of claim 1 wherein from 5 to 40% by weight of the water in the aqueous medium is replaced by a water soluble compound selected from the group consisting of water soluble alcohols, water soluble ketones and water soluble dioxane, said water soluble compound serving as an aid in solubilizing said organic liquid.

3. The method of claim 1, wherein said higher fatty acid has 12 to 18 carbon atoms.

4. The method of claim 1, wherein said higher fatty acid is selected from the group consisting of oleic acid, linoleic acid, linoleinic acid, lauric acid, and stearic acid.

5. The method of claim 1, wherein said malleable metal is selected from the group consisting of aluminum, brass and zinc.

6. The method of claim 1 wherein said organic liquid is a hydrocarbon selected from the group consisting of benzene, toluene and xylene.

7. The method of claim 1 wherein the organic liquid is a halogenated hydrocarbon selected from the group consisting of a halogenated paraffin and trichlorodiphenyl.

8. The method of claim 2 wherein the water soluble compound is a water soluble alcohol selected from the group consisting of n-propyl alcohol and iso-propyl alcohol.

9. The method of claim 2 wherein the water soluble compound is acetone.

10. The process of claim 1 wherein the malleable metal is aluminum.

11. The process of claim 1 wherein the malleable metal is brass.

12. The process of claim 1 wherein the malleable metal is zinc.

13. The process of claim 5 wherein the malleable metal which is subjected to the grinding is selected from the group consisting of metallic powders having a size less than 5 mesh and metallic foil having a size less than 5 mm.$^2$.

14. The method of claim 1 wherein said fatty acid has a melting point below 60° C.

15. The method of claim 1 wherein from 3 to 5% of said fatty acid is employed, and from 2.5 to 6% of said organic liquid is employed.

16. The method of claim 1 wherein from 80 to 150% of said aqueous medium is utilized, based on the weight of the metal which is subjected to the grinding.

17. The method of claim 1 further comprising washing said metal flakes after the completion of the grinding.

18. The method of claim 1 wherein said higher fatty acid is liquid at room temperature.

References Cited

UNITED STATES PATENTS

| | | | |
|---|---|---|---|
| 2,522,538 | 9/1950 | Rethwisch et al. | 106—290 |
| 2,587,268 | 2/1952 | Roberts | 106—290 |
| 2,591,245 | 4/1952 | Edwards | 106—290 |
| 3,025,252 | 3/1962 | Jack | 106—290 |

JAMES E. POER, Primary Examiner

U.S. Cl. X.R.

106—291